(12) United States Patent
Gantenbein et al.

(10) Patent No.: US 11,472,969 B2
(45) Date of Patent: Oct. 18, 2022

(54) COATING COMPOSITIONS COMPRISING GROUND NATURAL CALCIUM CARBONATE (GCC)

(71) Applicant: Omya International AG, Oftringen (CH)

(72) Inventors: Daniel Gantenbein, Basel (CH); Maryna Zinchenko, Elnesvagen (NO); Rolf Endre Orten, Molde (NO); Detlef Gysau, Full (CH); Dennis Werner, Dusseldorf (DE)

(73) Assignee: OMYA INTERNATIONAL AG, Oftringen (CH)

( * ) Notice: Subject to any disclaimer, the term of this patent is extended or adjusted under 35 U.S.C. 154(b) by 270 days.

(21) Appl. No.: 16/647,936

(22) PCT Filed: Sep. 26, 2018

(86) PCT No.: PCT/EP2018/076091
§ 371 (c)(1),
(2) Date: Mar. 17, 2020

(87) PCT Pub. No.: WO2019/068532
PCT Pub. Date: Apr. 11, 2019

(65) Prior Publication Data
US 2020/0263043 A1    Aug. 20, 2020

Related U.S. Application Data

(60) Provisional application No. 62/570,686, filed on Oct. 11, 2017.

(30) Foreign Application Priority Data

Oct. 4, 2017    (EP) .................................... 17194847

(51) Int. Cl.
| C09D 7/61 | (2018.01) |
| C09D 7/40 | (2018.01) |
| C09C 1/02 | (2006.01) |
| C09D 133/08 | (2006.01) |
| C08K 3/22 | (2006.01) |
| C08K 3/26 | (2006.01) |

(52) U.S. Cl.
CPC ................ *C09D 7/61* (2018.01); *C09C 1/021* (2013.01); *C09D 7/68* (2018.01); *C09D 133/08* (2013.01); *C08K 2003/2241* (2013.01); *C08K 2003/265* (2013.01); *C08K 2201/005* (2013.01); *C08K 2201/006* (2013.01)

(58) Field of Classification Search
CPC ...... C09C 1/021; C08K 3/26; C08K 2003/265
See application file for complete search history.

(56) References Cited

U.S. PATENT DOCUMENTS

2015/0122440 A1 * 5/2015 Senti-Wenk .............. C08L 3/08
106/804

FOREIGN PATENT DOCUMENTS

| EP | 2357213 A1 | 8/2011 |
| EP | 2662419 A1 | 5/2012 |
| EP | 2684916 A1 | 1/2014 |
| EP | 2722368 A1 | 4/2014 |
| EP | 3085742 A1 | 4/2015 |
| EP | 2949477 A1 | 12/2015 |
| EP | 3176204 A1 | 12/2015 |
| GB | 1404564 | 9/1975 |
| WO | 2012080343 A1 | 6/2012 |
| WO | 2012113876 A1 | 8/2012 |
| WO | 2016110459 A1 | 7/2016 |
| WO | 2016169753 A1 | 10/2016 |
| WO | WO-2016156454 A1 * | 10/2016 ............ B41M 5/508 |

OTHER PUBLICATIONS

PCT Patent Application No. PCT/EP2018/076091, International Search Report and The Written Opinion of the International Searching Authority, dated Oct. 29, 2018, 13 pages.

* cited by examiner

*Primary Examiner* — Brieann R Johnston
(74) *Attorney, Agent, or Firm* — Fay Sharpe LLP

(57) ABSTRACT

The present invention relates to a coating composition comprising at least one binder and at least one ground natural calcium carbonate material. The invention further relates to the use of at least one ground natural calcium carbonate material in a coating composition comprising at least one binder as well as to an article that is coated with such a coating composition and a paint comprising such a coating composition.

19 Claims, No Drawings

COATING COMPOSITIONS COMPRISING GROUND NATURAL CALCIUM CARBONATE (GCC)

The present invention relates to a coating composition comprising at least one binder and at least one ground natural calcium carbonate material. The invention further relates to the use of at least one ground natural calcium carbonate material in a coating composition comprising at least one binder as well as to an article that is coated with such a coating composition and a paint comprising such a coating composition.

Mineral pigments are widely used in coating systems, not only to decrease formulation costs but further to improve certain properties of the coating formulation, during its preparation or storage, or during or following its application to a substrate. Commonly used pigments in the field of paints and coatings include, for example, clay, mica, silica, talc, titanium dioxide or different types of calcium carbonate such as ground natural calcium carbonate or synthetic calcium carbonate and surface modified variants of the aforementioned calcium carbonates.

In case of opaque paints or coats, pigments providing for high opacity and high contrast ratio are generally preferred. Further desired properties may include, for example, a high whiteness degree, a low yellowness degree and good matting properties.

In order to achieve these goals, high performance pigments and in particular titanium dioxide, especially in the form of rutile, are often required, for providing significant opacity or hiding power. Titanium dioxide pigments marketed for use in paint formulation are well known.

However, titanium dioxide suffers from being relatively cost-intensive and, therefore, corresponding paints or coatings must be produced at high costs. Thus, there is a general need for more efficient pigments in terms of opacity, contrast ratio and the like or a general need for alternative pigments which may be used in the production of paints and coatings at less costs.

GB 1 404 564 describes ultrafine natural calcium carbonate filled paints and pigments, wherein said natural calcium carbonate has a weight average particle diameter of from 0.5 to 0.7 µm and a maximum diameter particle of from 3 to 4 µm and is employed to partially replace titanium dioxide.

EP 2 684 916 A1 discloses a process for producing surface modified calcium carbonate from a calcium carbonate containing mineral slurry in the presence of at least one water-soluble acid and carbon dioxide under stirring conditions. The surface modified calcium carbonate may be used as matting agent in paints and coatings.

WO 2016/169753 discloses a process for producing an aqueous slurry comprising a blend of surface modified calcium carbonate comprising particles (MCC) and precipitated calcium carbonate comprising particles (PCC). The aqueous slurry may be used in paper, paper coating, tissue paper, digital photo paper, paints, coatings, adhesives, plastics, waste water treating or waste water treating agents.

WO 2012/113876 A1 discloses a coating composition comprising an aqueous dispersion of submicron natural ground calcium carbonate particles contained in a liquid binder, characterized in that the composition comprises, in the case of a clear coating, at least one ground natural calcium carbonate having a median diameter of between 0.05 and 0.15 µm, while in the case of a glossy and opacifying coating, at least one ground natural calcium carbonate having a median diameter of between 0.05 and 0.3 µm and at least one pigment having a refractive index of greater than or equal to 2.5.

WO 2012/080343 discloses a mineral composition comprising mineral particles, said mineral particles, when in a densely compacted bed form, having a volume defined median pore diameter from 0.01 to 0.04 µm, and having an intruded total specific void volume of 0.1-0.3 $cm^3/g$. Such a composition in coatings allows the passage of ink solvent into the base paper while retaining the ink molecules on the surface.

WO 2016/110459 discloses a process for the manufacturing of a calcium carbonate-comprising material, as well as the use of the calcium carbonate-comprising material for paper filler and paper coating applications.

EP 2 357 213 discloses a coating composition providing gloss and opacity on application, having a pigment volume concentration of from 5% up to the critical pigment volume concentration and characterized in that comprises at least one ground natural calcium carbonate having a median diameter of between 0.05 and 0.3 µm, and at least one pigment having a refractive index of greater than or equal to 2.5.

EP 2 949 477 discloses a rotogravure printing medium comprising a substrate and a coating layer wherein the coating layer consist among others of at least one natural source of calcium carbonate. The calcium carbonate used in the examples of EP 2 949 477 has a weight median particle size $d_{50}$ value of 0.8 µm and a top cut of 2 to 7 µm measured with a Sedigraph™ 5120 and a volume median particle size $d_{50}$ value ($d_{50}$(Mal)) of 1.9 µm and a top cut ($d_{98}$(Mal)) of 8.0 µm measured with a Malvern Mastersizer 2000.

However, there is still a continuous need for alternative pigments or coating compositions providing better performance especially in terms of opacity, or contrast ratio, or whiteness properties which may be produced at less costs. Such alternative pigments or coating compositions may be used, for example, as an enhancer for established high performance pigments, such as titanium dioxide.

Accordingly, it is one object of the present invention to provide a pigment or coating composition having improved optical properties. In particular, it is an object of the present invention to provide a pigment or coating composition with improved optical properties when applied in paints.

One particular aim is the provision of pigments or coating compositions and corresponding paints providing improved opacity and/or improved contrast ratio properties and/or improved gloss.

Still another object may be seen in the provision of pigments or coating compositions and corresponding paints which have improved properties in terms of yellowness (preferably reduced yellowness) and whiteness (preferably increased whiteness) or improved brightness $R_y$ over black (preferably increased brightness $R_y$ over black).

Still another object of the present invention may be seen in the provision of pigments coating compositions and corresponding paints which may be produced at lower costs or which may be used at lower costs compared to conventional (high performance) pigments. Therefore, another object may be seen in the provision of a pigment or coating composition which may be used as an enhancer for known (high performance) pigments without negatively affecting the optical properties of the final product, for example in terms of opacity, contrast ratio, gloss, yellowness and/or brightness $R_y$ over black properties.

Another particular aim may be seen in the provision of a pigment or a corresponding coating composition which may be used as a first pigment together with a known second (high performance) pigment, thereby enhancing the optical properties of that known second pigment. It is thus another object of the present invention to reduce the overall consumption of and the costs for conventional (high performance) pigments while maintaining or improving the optical properties of corresponding paints.

The preparation of known pigments or coating compositions for use in paints typically comes along with a low productivity and high energy consumption for drying the materials and it is thus highly energy and cost consuming. As a result, conventional coating compositions are typically obtained in the form of aqueous or solvent based suspensions comprising relatively high amounts of water or solvent. Thus, another object of the present invention may therefore be seen in the provision of pigments or coating compositions with high solids content.

The foregoing and other problems may be solved by the subject-matter as defined herein in the independent claims.

A first aspect of the present invention relates to a coating composition comprising at least one binder and at least one ground natural calcium carbonate material, wherein the at least one ground natural calcium carbonate material has
  i) a volume median particle size $d_{50}$ value ($d_{50}$(Mal)) in the range from >0.3 µm and <1.0 µm,
  ii) a top cut ($d_{98}$(Mal)) in the range from >1.0 µm and <2.5 µm,
  iii) a $d_{98}/d_{50}$ (Mal) ratio of <3, and
  iv) a specific surface area (BET) of <20 m$^2$/g as measured using nitrogen and the BET method according to ISO 9277:2010.

The inventors surprisingly found that a coating composition comprising at least one binder and at least one ground natural calcium carbonate material according to the present invention, provides improved optical properties, especially in terms of contrast ratio or opacity, yellowness, brightness $R_y$ over black and/or matting properties, compared to conventional ground natural calcium carbonate. The at least one ground natural calcium carbonate material according to the present invention has i) a volume median particle size $d_{50}$ value ($d_{50}$(Mal)) in the range from >0.3 µm and <1.0 µm, ii) a top cut ($d_{98}$(Mal)) in the range from >1.0 µm and <2.5 µm, iii) a $d_{98}/d_{50}$ (Mal) ratio of <3, and iv) a specific surface area (BET) of <20 m$^2$/g as measured using nitrogen and the BET method according to ISO 9277:2010.

The inventors further discovered that the coating compositions of the present invention provide good optical properties also at high solids content. Surprisingly, the inventive coating composition may be used as a titanium dioxide enhancer allowing for a reduction of the titanium dioxide consumption while, at the same time, satisfactory or even improved optical properties may be achieved (especially contrast ratio, yellowness, gloss, brightness $R_y$ over black and/or matting properties).

Another aspect of the present invention refers to the use of at least one ground natural calcium carbonate material having i) a volume median particle size $d_{50}$ value ($d_{50}$(Mal)) in the range from >0.3 µm and <1.0 µm, ii) a top cut ($d_{98}$(Mal)) in the range from >1.0 gµm and <2.5 µm, iii) a $d_{98}/d_{50}$ (Mal) ratio of <3, and iv) a specific surface area (BET) of <20 m$^2$/g as measured using nitrogen and the BET method according to ISO 9277:2010, in a coating composition comprising at least one binder.

Still another aspect of the present invention relates to an article that is coated with the coating composition according to the present invention, wherein the article is made of concrete, wood, paper, metal or board.

Another aspect of the present invention relates to a paint comprising the coating composition according to the present invention.

The following terms used throughout the present application shall have the meanings set forth hereinafter:

The term "coating composition" as used herein refers to a composition in the form of a liquid, suspension, slurry, paste or powder. The coating composition comprises at least one binder and at least on ground natural calcium carbonate and optionally further materials such as liquids, for example water or solvent, and/or pigments other than ground natural calcium carbonate and/or colorants and/or fillers and/or other additives. A "liquid" in the meaning of the present invention refers to a nearly incompressible fluid that conforms to the shape of its container but retains a nearly constant volume independent of pressure. A "suspension" or "slurry" in the meaning of the present invention refers to a mixture comprising at least one insoluble solid in a liquid medium, for example water or solvent, and optionally further additives, and usually contains large amounts of solids and, thus, is more viscous (higher viscosity) and can have a higher density than the liquid medium from which it is formed. A "paste" in the meaning of the present invention refers to a mixture that behaves as a solid until a sufficiently large load or stress is applied, at which point it flows like a fluid and typically comprises of a suspension of granular material in a background fluid. A "powder" in the meaning of the present invention refers to a dry, bulk solid composed of a large number of fine particles that may flow freely when shaken or tilted.

The term "ground natural calcium carbonate" (GNCC) as used herein refers to a particulate material obtained from natural calcium carbonate-containing minerals (e.g. chalk, limestone, marble or dolomite) which has been processed in a wet and/or dry comminution step, such as crushing and/or grinding, and optionally has been subjected to further steps such as screening and/or fractionation, for example, by a cyclone or classifier.

The term "particulate" in the meaning of the present application refers to materials composed of a plurality of particles. Said plurality of particles may be defined, for example, by its particle size distribution ($d_{98}$, $d_{50}$ etc.).

The "particle size" of the ground natural calcium carbonate herein is described as volume-based particle size distribution $d_x$. Therein, the value $d_x$ represents the diameter relative to which x % by volume of the particles have diameters less than $d_x$. This means that, for example, the $d_{20}$ value is the particle size at which 20 vol % of all particles are smaller than that particle size. The $d_{50}$ value is thus the volume median particle size, i.e. 50 vol % of all particles are smaller than that particle size and the $d_{98}$ value, referred to as volume top cut, is the particle size at which 98 vol % of all particles are smaller than that particle size. For determining the volume determined particle size distribution, e.g., the volume median particle diameter ($d_{50}$) or the volume determined top cut particle size ($d_{98}$) of surface-reacted calcium carbonate, a Malvern Mastersizer 2000 is used. Due to this measurement method the values for example $d_{50}$ or the $d_{98}$ are also labelled as $d_{50}$(Mal) and $d_{98}$(Mal). The "$d_{98}/d_{50}$ (Mal) ratio" as used in the present application is the division of the $d_{98}$(Mal) value as defined above with the $d_{50}$(Mal) value as defined above.

The "particle size" of particulate materials other than the ground natural calcium carbonate (e.g. titanium dioxide) herein is described by a weight-based distribution of particle sizes $d_x$. Therein, the value $d_x$ represents the diameter relative to which x % by weight of the particles have diameters less than $d_x$. This means that, for example, the $d_{20}$ value is the particle size at which 20 wt % of all particles are smaller than that particle size. The $d_{50}$ value is thus the weight median particle size, i.e. 50 wt % of all particles are smaller than that particle size and the $d_{98}$ value, referred to as weight top cut, is the particle size at which 98 wt % of all particles are smaller than that particle size. For determining the weight median particle size distribution, for example the $d_{50}$ value a Sedigraph is used.

Throughout the present document, the "specific surface area (BET)" of a ground natural calcium carbonate material in the meaning of the present invention is defined as the surface area of the ground natural calcium carbonate material divided by its mass. As used herein, the specific surface area is measured by nitrogen gas adsorption using the BET isotherm (ISO 9277:2010) and is specified in $m^2/g$.

Throughout the present document, the term "binder" refers to an ingredient of the coating composition that keeps the particles, especially the ground natural calcium carbonate material stabilized within the coating composition and joins these particles into a uniform paint film. Therefore, the "binder" may also be referred to as "film former".

For the purpose of the present invention, the pigment volume concentration (PVC) is understood to refer to the fraction, quoted in % of pigment volume relative to the total volume of the pigment plus the other solid components of the coating composition, i.e. it accounts for the pigment volume relative to the total formulation volume in the final (dried; i.e. excluding water or other solvent) coating.

"Titanium dioxide" according to the present invention is a white pigment with the chemical formula $TiO_2$. Generally it is sourced from ilmenite and processed to rutile and anatase crystal form and is preferably used in the form of rutile.

For the purpose of the present invention, the gloss of a coating composition applied to a substrate is measured according to the measurement method provided in the examples section here below.

For the purpose of the present invention, the opacity of a coating composition applied to a substrate is measured according to the measurement method provided in the examples section here below.

For the purpose of the present invention, the brightness Ry over black of a coating composition applied to a substrate is measured according to the measurement method provided in the examples section here below.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Where an indefinite or definite article is used when referring to a singular noun, e.g. "a", "an" or "the", this includes a plural of that noun unless anything else is specifically stated.

In the following, preferred embodiments of the coating composition according to the present invention will be described. It is to be understood that these details and embodiments also apply to the use of the natural ground calcium carbonate according to the present invention in coating compositions as well as the article and the paint according to the present invention.

According to one embodiment of the present invention, the at least one ground natural calcium carbonate material has a volume median particle size $d_{50}$ value ($d_{50}$(Mal)) in the range from >0.4 µm and <0.9 µm, preferably in the range from >0.5 µm and <0.9 µm and most preferably in the range from >0.6 µm and <0.8 µm.

According to another embodiment of the present invention, the at least one ground natural calcium carbonate material has a top cut ($d_{98}$(Mal)) in the range from >1.1 µm and <2.2 µm, preferably in the range from >1.2 µm and <2.0 µm, and most preferably in the range from >1.3 µm and <1.8 µm.

According to a further embodiment of the present invention, the at least one ground natural calcium carbonate material has a $d_{98}/d_{50}$ (Mal) ratio in the range from >0.5 and <2.9, preferably in the range from >1.0 and <2.8 and most preferably in the range from >1.5 and <2.5.

According to another embodiment of the present invention, the at least one ground natural calcium carbonate material has a specific surface area (BET) in the range from >5 $m^2/g$ and <20 $m^2/g$ as measured using nitrogen and the BET method according to ISO 9277:2010, preferably in the range from >10 $m^2/g$ and <20 $m^2/g$ and most preferably in the range from >15 $m^2/g$ and <20 $m^2/g$.

According to another embodiment of the present invention, the at least one ground natural calcium carbonate material is selected from the group consisting of marble, limestone, dolomite and/or chalk and preferably is marble.

According to another embodiment of the present invention, the coating composition has a pigment volume concentration (PVC) of from 5 vol.-% to 98 vol.-%, preferably has a PVC of from 10 to 95 vol.-%, even more preferably 20 to 90 vol.-% and most preferably from 60 to 85 vol.-%.

According to another embodiment of the present invention, the at least one binder is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly(vinyl acetate/vinyl alcohol), poly((meth) acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly (n-butyl(meth)acrylate), poly(2-ethylhexyl (meth)acrylate), copolymers of (meth)acrylates, such as n-butyl(meth)acrylate and ethyl(meth)acrylate, copolymers of vinylacetate and n-butyl(meth)acrylate casein, copolymers of polyvinylchloride, cellulose ethers, xanthan, vinyl esters of versatic acid a vinyl acetate and ethylene copolymer, a styrene and acrylic ester copolymer and mixtures thereof.

According to another embodiment of the present invention the at least one binder is selected from the group consisting of copolymers of (meth)acrylates, such as n-butyl (meth)acrylate and ethyl(meth)acrylate, poly(styrene-co-(meth)acrylate), a vinyl acetate and ethylene copolymer, a styrene and acrylic ester copolymer, an acrylic and methacrylic acid ester copolymer, poly(vinyl acetate) and mixtures thereof more preferably is selected from the group consisting of poly(styrene-co-(meth)acrylate), a vinyl acetate and ethylene copolymer, a styrene and acrylic ester copolymer, an acrylic and methacrylic acid ester copolymer, poly(vinyl acetate) and mixtures thereof and most preferably is selected from the group consisting of a vinyl acetate and ethylene copolymer, a styrene and acrylic ester copolymer, an acrylic and methacrylic acid ester copolymer and mixtures thereof.

According to another embodiment of the present invention, the coating composition further comprises titanium dioxide.

According to another embodiment of the present invention, the titanium dioxide:ground natural calcium carbonate material dry weight ratio is of 90:10 to 20:80, preferably of 85:15 to 30:70 and most preferably of 80:20 to 40:60.

According to another embodiment of the present invention, the gloss and/or opacity and/or brightness Ry over black of the coating composition applied to a substrate is increased by at least 1%, preferably by at least 3%, and even more preferably by at least 5% relative to the gloss and/or opacity and/or brightness Ry over black of an identical coating composition that has been treated the same way wherein the ground natural calcium carbonate material is fully replaced by a ground natural calcium carbonate material with at least one of the parameters i) to iv) outside the ranges as claimed in claim 1.

According to another embodiment of the present invention, the coating composition further comprises a dispersant, preferably a polyacrylate and more preferably a polyacrylate neutralized with sodium, ammonium and/or potassium and/or a hydrophobically modified polyacrylate. According to a preferred embodiment, the dispersant is present in the coating composition in an amount of 0.1 to 5 wt.-%, based on the total weight of the coating composition, preferably in an amount of 0.15 to 4 wt.-%, even more preferably in an amount of 0.2 to 2 wt.-% and most preferably in an amount of 0.25 to 0.5 wt.-%, e.g. 0.29 or 0.4 wt.-%, based on the total weight of the coating composition.

Ground Natural Calcium Carbonate Material (GNCC)

The coating composition of the present invention comprises at least one ground natural calcium carbonate material (GNCC) according to claim 1.

The expression "at least one" ground natural calcium carbonate material (GNCC) means that one or more, for example, two or three calcium carbonate-comprising materials may be present in the coating composition. According to a preferred embodiment only one ground natural calcium carbonate material (GNCC) is present in the coating composition.

Ground natural calcium carbonate (GNCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable form of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

In one embodiment of the present invention, the ground natural calcium carbonate material is selected from the group consisting of marble, limestone, dolomite, and/or chalk. More preferably, the ground natural calcium carbonate material is chalk, limestone and/or marble, even more preferably limestone and/or marble, and most preferably marble.

"Marble" in the meaning of the present invention is a calcium carbonate-comprising metamorphic rock composed of recrystallized carbonate minerals, most commonly calcite or dolomite.

"Chalk" in the meaning of the present invention is a soft, white, porous, sedimentary carbonate rock, composed of the mineral calcite.

"Limestone" in the meaning of the present invention is a sedimentary rock. Its major materials are the minerals calcite and aragonite.

"Dolomite" in the meaning of the present invention is a calcium carbonate-comprising mineral, namely a carbonic calcium-magnesium-mineral, having the chemical composition of $CaMg(CO_3)_2$ ("$CaCO_3 \cdot MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

It is appreciated that the ground natural calcium carbonate material can be one or a mixture of different kinds of ground natural calcium carbonate material(s).

In one embodiment of the present invention, the ground natural calcium carbonate material comprises, preferably consists of, one kind of ground natural calcium carbonate material. Alternatively, the ground natural calcium carbonate material comprises, preferably consists of, two or more kinds of ground natural calcium carbonate materials. For example, the ground natural calcium carbonate material comprises, preferably consists of, two or three kinds of ground natural calcium carbonate materials.

It is appreciated that the amount of calcium carbonate in the at least one ground natural calcium carbonate material is at least 60 wt.-%, preferably at least 80 wt.-%, e.g. at least 95 wt.-%, more preferably between 97 and 100 wt.-%, and even more preferably between 98.5 and 99.95 wt.-%, based on the total dry weight of the at least one ground natural calcium carbonate material.

The ground natural calcium carbonate material used in the coating composition of the present invention has a specific particle size distribution, wherein the volume median particle size $d_{50}$ value ($d_{50}$(Mal)) is in the range from >0.3 μm and <1.0 μm and the top cut ($d_{98}$(Mal)) in the range from >1.0 μm and <2.5 μm. The ground natural calcium carbonate material used in the inventive coating composition may also be referred to as ultrafine ground natural calcium carbonate material. Furthermore, the ground natural calcium carbonate material used in the coating composition of the present invention has a $d_{98}/d_{50}$ (Mal) ratio of <3, and a specific surface area (BET) of <20 m$^2$/g as measured using nitrogen and the BET method according to ISO 9277:2010.

In general, ground natural calcium carbonate material having a volume median particle size $d_{50}$ value ($d_{50}$(Mal)) is in the range from >0.3 μm and <1.0 μm and the top cut ($d_{98}$(Mal)) in the range from >1.0 μm and <2.5 μm as well as a $d_{98}/d_{50}$ (Mal) ratio of <3, and a specific surface area (BET) of <20 m$^2$/g as measured using nitrogen and the BET method according to ISO 9277:2010 as used in the present invention may be obtained by any suitable grinding method known in the art, wherein dry grinding, wet grinding or both, a combination of wet grinding and dry grinding steps may be used.

According to one embodiment, the ground natural calcium carbonate material is a wet-ground natural calcium carbonate. In another embodiment, the ground natural calcium carbonate material is a dry-ground natural calcium carbonate material.

The grinding step can be carried out in a dry or wet grinding process with any conventional grinding device, for example, under conditions such that refinement predominantly results from impacts with a secondary body, i.e. in one or more of a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. The grinding step may also be performed under conditions such that autogenous grinding takes place and/or by horizontal ball milling, and/or other such processes known to the skilled man.

In one embodiment, grinding is carried out in a vertical or horizontal ball mill, preferably in a vertical ball mill. Such vertical and horizontal ball mills usually consist of a vertically or horizontally arranged, cylindrical grinding chamber comprising an axially fast rotating agitator shaft being equipped with a plurality of paddles and/or stirring discs, such as described for example in EP 0 607 840 A1.

It is to be noted that grinding of the calcium carbonate-containing mineral may be carried out by using at least one of the aforementioned grinding methods or devices. However, it is also possible to use a combination of any of the foregoing methods or a series of any of the aforementioned grinding devices.

Subsequent to the grinding step, the ground calcium carbonate-containing mineral may, optionally, be divided into two or more fractions, each having different particle distributions, by use of a classifying step. A classifying step in general serves to divide a feed fraction having a certain particle size distribution into a coarse fraction, which may be subjected to another grinding cycle, and a fine fraction, which may be used as the final product. For this purpose, screening devices as well as gravity-based devices, such as centrifuges or cyclones (e.g. hydrocyclones) and any combination of the aforementioned devices may be used.

The wet processed ground natural calcium carbonate material may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

As already indicated above, the ground natural calcium carbonate material used in the coating composition of the present invention is an ultrafine ground natural calcium carbonate (UF-GNCC) having a volume median particle size $d_{50}$ value ($d_{50}$(Mal)) is in the range from >0.3 µm and <1.0 µm and the top cut ($d_{98}$(Mal)) in the range from >1.0 µm and <2.5 µm as well as a $d_{98}/d_{50}$ (Mal) ratio of <3, and a specific surface area (BET) of <20 m$^2$/g as measured using nitrogen and the BET method according to ISO 9277:2010.

In some embodiments of the present invention the at least one ground natural calcium carbonate material has a volume median particle size $d_{50}$ value ($d_{50}$(Mal)) in the range from >0.4 µm and <0.9 µm, preferably in the range from >0.5 µm and <0.9 µm and most preferably in the range from >0.6 µm and <0.8 µm.

According to another embodiment of the present invention, the at least one ground natural calcium carbonate material has a top cut ($d_{98}$(Mal)) in the range from >1.1 µm and <2.2 µm, preferably in the range from >1.2 µm and <2.0 µm, and most preferably in the range from >1.3 µm and <1.8 µm.

According to another embodiment of the present invention, the at least one ground natural calcium carbonate material has a $d_{98}/d_{50}$ (Mal) ratio in the range from >0.5 and <2.9, preferably in the range from >1.0 and <2.8 and most preferably in the range from >1.5 and <2.5.

According to another embodiment of the present invention, the at least one ground natural calcium carbonate material has a specific surface area (BET) in the range from >5 m$^2$/g and <20 m$^2$/g as measured using nitrogen and the BET method according to ISO 9277:2010, preferably in the range from >10 m$^2$/g and <20 m$^2$/g and most preferably in the range from >15 m$^2$/g and <20 m$^2$/g.

The inventors surprisingly found that the particle size distribution of the ground natural calcium carbonate material, defined in terms of a specific volume-based median particle size $d_{50}$ value ($d_{50}$(Mal)) and top cut ($d_{98}$(Mal) has an influence on the desired optical properties of the inventive coating composition and paints or coatings prepared thereof, for example in terms of gloss, opacity, contrast ratio, yellowness and/or brightness Ry over black. The particle size distribution may also have an influence on the viscosity of the inventive coating composition. Additionally to that, the inventors found that also the weight-based particle diameter ratio $d_{98}/d_{50}$ (Mal) also has an influence on the desired optical properties of the inventive coating composition and paints and/or coatings prepared thereof. Said ratio is indicative for the steepness of the particle size distribution meaning that, for example, a high value represents a broad distribution curve. Finally, the inventors found that also the specific surface area (BET) value of the ground natural calcium carbonate material has an influence on the desired optical properties of the inventive coating composition and paints and/or coatings prepared thereof.

According to one embodiment of the present invention, the ground natural calcium carbonate material used in the coating composition of the present invention is an ultrafine ground natural calcium carbonate (UF-GNCC) having a volume median particle size $d_{50}$ value ($d_{50}$(Mal)) is in the range from >0.3 µm and <1.0 µm, preferably in the range from >0.4 µm and <0.9 µm, more preferably in the range from >0.5 µm and <0.9 µm and most preferably in the range from >0.6 µm and <0.8 µm and the top cut ($d_{98}$(Mal)) in the range from >1.0 µm and <2.5 µm, preferably in the range from >1.1 µm and <2.2 µm, more preferably in the range from >1.2 µm and <2.0 µm, and most preferably in the range from >1.3 µm and <1.8 µm and a $d_{98}/d_{50}$ (Mal) ratio of <3, preferably in the range from >0.5 and <2.9, preferably in the range from >1.0 and <2.8 and most preferably in the range from >1.5 and <2.5 and a specific surface area (BET) of <20 m$^2$/g, preferably in the range from >5 m$^2$/g and <20 m$^2$/g, more preferably in the range from >10 m$^2$/g and <20 m$^2$/g and most preferably in the range from >15 m$^2$/g and <20 m$^2$/g as measured using nitrogen and the BET method according to ISO 9277:2010.

According to a preferred embodiment of the present invention, the ground natural calcium carbonate material used in the coating composition of the present invention is an ultrafine ground natural calcium carbonate (UF-GNCC) having a volume median particle size $d_{50}$ value ($d_{50}$(Mal)) in the range from >0.6 μm and <0.8 μm and the top cut ($d_{98}$(Mal)) is in the range from >1.3 μm and <1.8 μm and a $d_{98}/d_{50}$ (Mal) ratio in the range from >1.5 and <2.5 and a specific surface area (BET) in the range from >15 $m^2$/g and <20 $m^2$/g as measured using nitrogen and the BET method according to ISO 9277:2010.

Optionally, the ground natural calcium carbonate material used in the inventive coating composition may be surface-treated with any suitable hydrophobizing agent known to the skilled person, for example fatty acids having from 6 to 24 chain carbon atoms such as stearic acid. However, in a preferred embodiment, the ground natural calcium carbonate material is untreated.

The ground natural calcium carbonate material may be used in powder form or in the form of a suspension or slurry, preferably in the form of an aqueous suspension or slurry. According to a preferred embodiment of the present invention the ground natural calcium carbonate material is used in the form of an aqueous suspension or slurry. Preferably the content of the ground natural calcium carbonate material within the suspension or slurry that is used in the coating composition is in the range of from 1 to 90 wt %, more preferably from 10 to 85 wt %, even more preferably from 50 to 80 wt %, and most preferably from 60 to 75 wt %, based on the total weight of said suspension or slurry. Such a suspension or slurry is also called "high solids content" suspension or slurry.

If the ground natural calcium carbonate material is used in form of a suspension or slurry, the suspension or slurry also known as"high solids content" suspension or slurry may have a Brookfield viscosity of from 200 to 2000 mPa·s, more preferably of from 250 to 1000 mPa·s, e.g. 300 mPa·s, as measured according to the measurement method provided in the examples section here below.

For the purpose of the present invention, the term "Brookfield viscosity" refers to Brookfield viscosity of the ground natural calcium carbonate material in form of a suspension or slurry. The Brookfield viscosity is for this purpose measured by a Brookfield DV-III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 seconds after the start of the measurement. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

Said suspension or slurry may optionally be stabilized by a dispersant. Conventional dispersants known to the skilled person can be used. A preferred dispersant is comprised of polyacrylic acids and/or carboxymethylcelluloses. In one embodiment, the dispersant is a polyacrylate-based dispersant, including partially or fully neutralized polyacrylates.

According to a preferred embodiment of the present invention the dispersant is a sodium polyacrylate/sodium phosphate based dispersing agent, which is a blend of partially neutralized sodium polyacrylate (with a molecular weight Mw equal to 12'000 Dalton, measured by GPC) and sodium phosphates, produced by mixing 40% sodium polyacrylate and 85% solid phosphoric acid in a ratio 2:1 based on the dry weight of each additive.

Binder

The coating composition of the present invention comprises at least one binder according to claim 1.

The expression "at least one" binder means that one or more, for example, two or three binders may be present in the coating composition. According to a preferred embodiment only one binder is present in the coating composition.

As already set out above, the term "binder" refers to an ingredient of the coating composition that keeps the particles, especially the ground natural calcium carbonate material stabilized and joins these particles into a uniform paint film. Without being bound to any theory, the inventors assume that at least some of the binder adheres to the surface of the ground natural calcium carbonate material and forms a layer on the surface of the ground natural calcium carbonate material and/or binds to itself and/or to certain other materials upon drying. The binding includes ionic interactions and/or hydrogen-hydrogen-bridge bonds between the groups on the surface of the ground natural calcium carbonate material and the functional groups of the binder.

According to one embodiment of the present invention, the at least one binder is selected from the group consisting of alkyd resin, epoxy resin, epoxy ester resin, poly(vinyl alcohol), poly(vinyl pyrrolidone), poly(vinyl acetate), poly (oxazolines), poly(vinylacetamides), partially hydrolyzed poly(vinyl acetate/vinyl alcohol), poly((meth)acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl(meth)acrylate), poly(2-ethylhexyl (meth)acrylate), copolymers of (meth)acrylates, such as n-butyl(meth)acrylate and ethyl (meth)acrylate, copolymers of vinylacetate and n-butyl (meth)acrylate casein, copolymers of polyvinylchloride, cellulose ethers, xanthan, vinyl esters of versatic acid a vinyl acetate and ethylene copolymer, a styrene and acrylic ester copolymer and mixtures thereof. The above binders or groups of binders are known to the skilled person and are commercially available.

According to a preferred embodiment of the present invention, the at least one binder is selected from the group consisting of copolymers of (meth)acrylates, such as n-butyl (meth)acrylate and ethyl(meth)acrylate, poly(styrene-co-(meth)acrylate), a vinyl acetate and ethylene copolymer, a styrene and acrylic ester copolymer, an acrylic and methacrylic acid ester copolymer, poly(vinyl acetate) and mixtures thereof more preferably selected from the group consisting of poly(styrene-co-(meth)acrylate), a vinyl acetate and ethylene copolymer, a styrene and acrylic ester copolymer, an acrylic and methacrylic acid ester copolymer, poly(vinyl acetate) and mixtures thereof and most preferably is selected from the group consisting of a vinyl acetate and ethylene copolymer, a styrene and acrylic ester copolymer, an acrylic and methacrylic acid ester copolymer and mixtures thereof.

According to the present invention the terms "acrylic acid ester copolymer" or "methacrylic acid ester copolymer" and the terms "acrylic ester copolymer" or "methacrylic ester copolymer" are synonyms and can be used interchangeable.

The binder according to the present invention can be a waterborne binder and/or a solventborne binder. A "waterborne" or "water-based" binder according to the present invention is a binder that is dilutable with water. "Waterborne" or "water-based" binders according to the present invention are, for example, poly(vinyl alcohol), poly(vinyl pyrrolidone) or poly((meth)acrylic acid), copolymers of (meth)acrylates, such as n-butyl(meth)acrylate and ethyl (meth)acrylate, poly(styrene-co-(meth)acrylate), vinyl acetate and ethylene copolymers, styrene and acrylic ester copolymers, acrylic and methacrylic acid ester copolymers, poly(vinyl acetate) and mixtures thereof. A "solventborne" binder according to the present invention is a binder that is dilutable with a solvent. According to one embodiment of the present invention the binder according to the present invention is a waterborne binder. According to another embodiment of the present invention the binder according to the present invention is a solventborne binder. Alternatively, the binder according to the present invention is a waterborne and solventborne binder. The skilled person knows waterborne and solventborne binders.

According to an exemplified embodiment of the present invention, the binder is a vinyl acetate and ethylene copolymer and is, for example, commercially available under the trade name Mowilith LDM 1871, from Celanese.

According to another exemplified embodiment of the present invention, the binder is a styrene and acrylic ester copolymer and is, for example, commercially available under the trade name Mowilith LDM 6119, from Celanese.

According to a further exemplified embodiment of the present invention, the binder is an acrylic and methacrylic acid ester copolymer and is, for example, commercially available under the trade name Mowilith LDM 7717, from Celanese.

The binder of the present invention may be nonionic, anionic or cationic. The term "anionic binder" or "cationic binder" in the meaning of the present invention refers to a binder having a negative net charge or a positive net charge. The anionic binder is typically modified with anionic groups and the cationic binder is typically modified with cationic groups. The term "anionic" does not exclude the presence of cationic groups provided that the sum of individual charges is negative. The term "cationic" does not exclude the presence of anionic groups provided that the sum of individual charges is positive. The sum of the individual charges, also known as the net charge is measured with methods well-known to the skilled person, such as for example the measurement of the zeta potential or by polyelectrolyte titration.

The binder can be in the form of a solution or dry material. According to a preferred embodiment, the binder is in form of an solution and most preferably in the form of an aqueous solution.

According to one embodiment of the present invention, the binder is in form of an aqueous solution having a binder concentration from 1 to 90 wt.-%, preferably from 10 to 80 wt.-%, more preferably from 20 to 70 wt.-%, and most preferably from 30 to 60 wt.-%, based on the total weight of the binder solution.

The Coating Composition

The coating composition according to the present invention comprises at least one binder and at least one ground natural calcium carbonate material, wherein the at least one ground natural calcium carbonate material has
i) a volume median particle size $d_{50}$ value ($d_{50}$(Mal)) in the range from $>0.3$ µm and $<1.0$ µm,
ii) a top cut ($d_{98}$(Mal)) in the range from $>1.0$ µm and $<2.5$ µm,
iii) a $d_{98}/d_{50}$ (Mal) ratio of $<3$, and
iv) a specific surface area (BET) of $<20$ m$^2$/g as measured using nitrogen and the BET method according to ISO 9277:2010.

The at least one binder and at least one ground natural calcium carbonate material according to the present invention have already been described above in more detail.

According to one embodiment of the present invention, the coating composition has a pigment volume concentration (PVC) of from 5 vol.-% to 98 vol.-%, preferably has a PVC of from 10 to 95 vol.-%, even more preferably 20 to 90 vol.-% and most preferably from 60 to 85 vol.-%. The pigment volume concentration is calculated as described in Section 6.2.3 of the book entitled "Fillers for Paints" by Detlef Gysau (Hannover: Vincentz Network 2017).

Alternatively, the coating composition has a volume concentration of the ground natural calcium carbonate of from 5 vol.-% to 98 vol.-%, preferably has a volume concentration of from 10 to 95 vol.-%, even more preferably 30 to 90 vol.-% and most preferably from 60 to 85 vol.-%. The volume concentration of the ground natural calcium carbonate is calculated as described in Section 6.2.3 of the book entitled "Fillers for Paints" by Detlef Gysau (Hannover: Vincentz Network 2017).

Alternatively, the total solids content of the inventive coating composition ranges from 20 to 85 wt.-%, based on the total weight of the coating composition, even more preferably from 30 to 75 wt.-%, even more preferably from 35 to 70 wt.-% and most preferably from 40 to 65 wt.-%, based on the total weight of the coating composition.

Alternatively, the solids content of the ground natural calcium carbonate material of the inventive coating composition ranges from 20 to 85 wt.-%, based on the total weight of the coating composition, even more preferably from 30 to 70 wt.-%, even more preferably from 35 to 65 wt.-% and most preferably from 40 to 60 wt.-%, based on the total weight of the coating composition.

According to another embodiment of the present invention, the binder according to the present invention is present in the coating composition in an amount from 1 to 90 wt.-%, based on the total weight of the coating composition, even more preferably from 2 to 80 wt.-%, even more preferably from 5 to 75 wt.-% and most preferably from 8 to 70 wt.-%, based on the total weight of the coating composition.

The ground natural calcium carbonate material and the binder are present in the coating composition at a ratio of from 99:1 to 1:99, based on dry weights, preferably at a ratio of from 95:5 to 5:95 and most preferably at a ratio from 90:10 to 10:90. The aforementioned ratio may have an influence on the desired optical properties of the inventive coating composition and paints or coatings prepared thereof, for example in terms of opacity, contrast ratio, yellowness, gloss, brightness Ry over black and/or matting properties.

Said coating composition may further include one or more components selected from the group comprising pigments, especially colouring pigments; additives, such as defoamers, levelling agents, flatting agents, preservatives, optical brighteners, oxidative- and/or UV-stabilizers, antioxidants and rheological additives, such as thickeners, dispersants; solvents, such as glycol ethers and fillers. Generally, any additives, which can usually be used in coating compositions, which are well-known in the art may be used in the present invention.

According to one preferred embodiment of the present invention the coating composition further comprises titanium dioxide. "Titanium dioxide" according to the present invention is a white pigment with the chemical formula $TiO_2$. Generally it is sourced from ilmenite and processed to rutile and anatase and is preferably used in the form of rutile.

According to a preferred embodiment of the present invention the coating composition consists of at least one binder according to the present invention, at least one ground natural calcium carbonate material according to the present invention and titanium dioxide.

According to one embodiment of the present invention, the titanium dioxide is present in the coating composition in an amount from 0.1 to 90 wt.-%, based on the total weight of the coating composition, even more preferably from 0.2 to 70 wt.-%, even more preferably from 0.5 to 40 wt.-% and most preferably from 1 to 20 wt.-%, based on the total weight of the coating composition.

According to another embodiment of the present invention the titanium dioxide:ground natural calcium carbonate material dry weight ratio is of 90:10 to 20:80, preferably of 85:15 to 30:70 and most preferably of 80:20 to 40:60.

According to another embodiment of the present invention the coating composition does not comprise titanium dioxide in addition to the ground natural calcium carbonate material.

Further additives, which may be useful in the present invention include solvents such as aromatic and aliphatic hydrocarbons, mineral spirits, naphtha, propylene and ethylene glycols, etc.; coalescing solvents such as texanol, butyl carbitol, butyl diglycol, butyl cellosolve, diethylene glycol mono methyl/butyl/hexyl/ethyl ethers, etc.; plasticizers such as various phthalates, such as dibutyl, diethyl, dioctyl, dimethyl, benzyl, dialkyl phthalates, etc.; anti settling agents, such as attapulgite clay, cellulosic thickeners (e.g. HEC, HMEC, HMPC, etc); dispersants, such as polyacrylates, which may be sodium, ammonium, and/or potassium neutralized, and/or hydrophobically modified; surfactants such as anionic or non-ionic surfactants; rheology modifiers such as associative and non-associative acrylics, and polyurethanes; defoamers, which may be mineral oil based, silicone based, etc.; biocides, e.g. those commonly used for in can preservation; mildewcides, e.g. those commonly used for resistance to mildew of dried paints; driers, especially those typically used with emulsified alkyds/water reducible alkyds; a wide variety of metals such as cobalt, zinc, zirconium, calcium, manganese, etc.; UV-absorbers, such as those typically used in either UV cure systems, or in some wood stains and finishes; stabilizers such as hindered amine light stabilizers, e.g. those typically used in either UV cure systems, or in some wood stains and finishes in combination with UV absorbers.

Further additives, which may be used in the present invention are any one commonly used in coating and paint formulations, and can be found in corresponding textbooks, and guidelines known to the person skilled in the art such as the VdL-Richtlinie "Bautenanstrichstoffe" (VdL-RL 01/Juni 2004; published by Verband der deutschen Lackindustrie e.V.).

Preferably, the coating composition has a high shear viscosity of from 70 to 500 mPa·s, preferably of from 100 to 300 mPa·s, and most preferably of from 120 to 250 mPa·s and a low shear viscosity of from 100000 to 600 mPa·s, as measured according to the measurement method provided in the examples section here below.

Preferred ranges for the low shear viscosity of the coating composition are in the range of from 100000 to 10000 mPa·s, for $D=1$ $s^{-1}$, are in the range of from 25000 to 5000 mPa·s, for $D=5$ $s^{-1}$, are in the range of from 15000 to 3000 mPa·s, for $D=10$ $s^{-1}$, and are in the range of from 6000 to 600 mPa·s, for $D=40$ $s^{-1}$. D is the shear rate and is given in $s^{-1}$.

For the purpose of the present invention, the term "viscosity" of the coating composition refers to high shear viscosity also known as ICI viscosity and low shear viscosity. The high shear viscosity or ICI viscosity is for this purpose measured with an Analoge ICI Cone & Plate Viscosimeter from REL (Research Equipment London) according to ASTM D4287 with a shear rate of 10000 $s^{-1}$. The low shear viscosity is for this purpose measured with a PaarPhysica MCR 301 Plate-Plate (PP25) by the method given in the PaarPhysica manual. Shear rates from 1 $s^{-1}$ (for viscosities of 1000000 mPa·s and 10000 mPa·s) to 40 $s^{-1}$ (for viscosities of 600 mPa·s and 6000 mPa·s) are used. Measurements are performed at 24° C.±3° C.

The inventors surprisingly found that an coating composition comprising at least one binder and at least one ground natural calcium carbonate material according to the present invention, provides improved optical properties, especially in terms of contrast ratio or opacity, yellowness, brightness $R_y$ over black and/or matting properties, compared to conventional ground natural calcium carbonate.

It is an especially preferred embodiment of the invention that the gloss and/or opacity and/or brightness Ry over black of the coating composition according to the present invention is equal to or greater than the gloss and/or the opacity and/or the brightness Ry over black of an identical coating composition that has been treated the same way wherein the ground natural calcium carbonate material is fully replaced by a ground natural calcium carbonate material with at least one of the parameters i) to iv) outside the ranges as claimed in claim 1.

According to a preferred embodiment of the present invention at least one value selected from gloss and opacity and brightness Ry over black of the coating composition according to the present invention is equal to or greater than the gloss or the opacity or the brightness Ry over black of an identical coating composition that has been treated the same way wherein the ground natural calcium carbonate material is fully replaced by a ground natural calcium carbonate material with at least one of the parameters i) to iv) outside the ranges as claimed in claim 1.

According to a preferred embodiment of the present invention, the gloss and/or opacity and/or brightness Ry over black of the coating composition applied to a substrate is increased by at least 1%, preferably by at least 3%, and even more preferably by at least 5% relative to the gloss and/or opacity and/or brightness Ry over black of an identical coating composition that has been treated the same way wherein the ground natural calcium carbonate material is fully replaced by a ground natural calcium carbonate material with at least one of the parameters i) to iv) outside the ranges as claimed in claim 1.

According to a preferred embodiment of the present invention, the gloss and/or opacity and/or brightness Ry over black of the coating composition applied to a substrate is increased by at least 1%, preferably by at least 3%, and even more preferably by at least 5% relative to the gloss and/or opacity and/or brightness Ry over black of an identical coating composition that has been treated the same way wherein the ground natural calcium carbonate material is fully replaced by a ground natural calcium carbonate material with at least one of the parameters i) to iv) outside the ranges as claimed in claim 1, wherein the inventive and the comparative coating composition comprise titanium dioxide, preferably in an amount of 1 wt.-% to 15 wt.-% and even more preferably 5 wt.-% to 12 wt.-%, based on the total weight of the coating composition.

The inventors surprisingly found that the aforementioned optical properties may be improved by using the inventive coating composition, for example in comparison to conventional calcium carbonate pigments. The inventive coating composition may also be used to enhance the optical properties of other high performance pigments, such as titanium dioxide, thereby reducing overall costs for the preparation of paints and coating at equal or improved performance.

Use of at Least One Ground Natural Calcium Carbonate in a Coating Composition Comprising at Least One Binder According to the present invention at least one ground natural calcium carbonate material having i) a volume median particle size $d_{50}$ value ($d_{50}$(Mal)) in the range from >0.3 μm and <1.0 μm, ii) a top cut ($d_{98}$(Mal)) in the range from >1.0 μm and <2.5 μm, iii) a $d_{98}/d_{50}$ (Mal) ratio of <3, and iv) a specific surface area (BET) of <20 m$^2$/g as measured using nitrogen and the BET method according to ISO 9277:2010, is used in a coating composition comprising at least one binder.

The ground natural calcium carbonate, the binder and the coating composition according to the present invention have already been described above in more detail.

The skilled person will appreciate that the details and embodiments discussed hereinabove with respect to the ground natural calcium carbonate material, the binder and the details and embodiments concerning the coating composition as such will apply accordingly to the use of at least one ground natural calcium carbonate in a coating composition comprising at least one binder.

Article and Paint

In view of its good optical properties in combination with its good handleability, the coating composition of the present invention is particularly suitable for use in paints and coatings. Furthermore, the coating composition of the present invention may be used for coating articles.

Therefore, one aspect of the present invention relates to the use of the inventive coating composition in paints or coatings and to these paints or coatings as such comprising the inventive coating composition. Due to its good optical properties at less costs, another aspect relates to the use of the inventive coating composition as titanium dioxide enhancer.

A "titanium dioxide enhancer" in the meaning of the present invention is a pigment which, when used together with a titanium dioxide pigment, is capable of improving the optical properties of titanium dioxide. Preferably, the aforementioned improved optical properties include opacity, contrast ratio, gloss, brightness Ry over black or any combinations thereof.

Another aspect of the present invention refers to an article that is coated with the inventive coating composition or an article that is coated with a paint comprising the inventive coating composition. The article can be any article that is coated or painted. According to one embodiment of the present invention the article is made of concrete, wood, paper, metal or board.

EXAMPLES

The scope and interest of the invention may be better understood on basis of the following examples which are intended to illustrate embodiments of the present invention.

1. Measuring Methods

Particle size distribution (mass % particles with a diameter<X and volume % particles with a diameter <X), weight median diameter ($d_{50}$) of a particulate material and volume median diameter ($d_{50}$) of a particulate material Weight particle diameter and particle diameter mass distribution of a particulate material were determined via the sedimentation method, i.e. an analysis of sedimentation behaviour in a gravitational field. The measurement was made with a Sedigraph™ 5120 of Micromeritics Instrument Corporation.

Weight median particle diameter [$d_{50}$ (Sedi)], using the sedimentation method, indicates a diameter value such that 50% of the particles by weight have a diameter less than this value, and 50% of the particles by weight have a diameter larger than this value. The $d_{98}$ (Sedi), measured using the sedimentation method, indicates a diameter value such that 98% by weight of the particles have a diameter of less than this value.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

Volume median particle diameter [$d_{50}$ (Mal)] indicates a diameter value such that 50% of the particles by volume have a diameter less than this value, and 50% of the particles by volume have a diameter larger than this value and was evaluated using a Malvern Mastersizer 2000 with the Fraunhofer model. The $d_{98}$ (Mal), measured using Malvern Mastersizer 2000 (Fraunhofer), indicates a diameter value such that 98% by volume of the particles have a diameter of less than this value. The raw data obtained by the measurement was analyzed using the Mie theory, with a particle refractive index of 1.57 and an absorption index of 0.005. The methods and instruments are known to the skilled person and are commonly used to determine particle size distributions of fillers and pigments. The method and the instrument are known to the skilled person and are commonly used in the field of fillers and pigments.

BET Specific Surface Area of a Material

Throughout the present document, the specific surface area (in m$^2$/g) of a particulate material was determined using the BET method (using nitrogen as adsorbing gas), which is well known to the skilled man (ISO 9277:2010). The total surface area (in m$^2$) of the particulate material is then obtained by multiplication of the specific surface area and the mass (in g) of the particulate material. The method and the instrument are known to the skilled person and are commonly used to determine the specific surface of particulate materials.

Suspension pH Measurement

The pH of a suspension is measured at 25° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

Viscosity Measurements

Brookfield Viscosity

The term "Brookfield viscosity" refers to Brookfield viscosity of the ground natural calcium carbonate material in form of a suspension or slurry. The Brookfield viscosity is for this purpose measured by a Brookfield DV-III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 seconds after the start of the measurement. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

High Shear Viscosity

The term "high shear viscosity" refers to the high shear viscosity of the coating compositions, also known as "ICI viscosity" of the coating composition.

The high shear viscosity or ICI viscosity is for this purpose measured with an Analoge ICI Cone & Plate Viscosimeter from REL (Research Equipment London) according to ASTM D4287 with a shear rate of 10000 s$^{-1}$ at a temperature of 24° C.±3° C.

Low Shear Viscosity

The term "low shear viscosity" refers to the low shear viscosity of the coating compositions.

The low shear viscosity is for this purpose measured with a PaarPhysica MCR 301 Plate-Plate (PP25) by the method given in the PaarPhysica manual. Shear rates from 1 s$^{-1}$ (for viscosities of 1000000 mPa·s and 10000 mPa·s) to 40 s$^{-1}$ (for viscosities of of 600 mPa·s and 6000 mPa·s) are used. Measurements are performed at 24° C.±3° C.

Solids Content

The solids content (also known as "dry weight") is determined using a Moisture Analyser HR73 from the company Mettler-Toledo, Switzerland, with the following settings: temperature of 120° C., automatic switch off 3, standard drying, 5 to 20 g of product.

Rx, Ry and Rz

The colour values Rx, Ry, Rz and especially the brightness Ry over black, indicated in the present application are determined over white and black fields of the Leneta contrast card and are measured with using a Spectraflash SF 450× spectrophotomer of the company Datacolor, Montreuil, France according to DIN 53 140.

Pigment Whiteness

Pigment whiteness Ry was measured using an ELREPHO 3000 from the company Datacolor according to DIN 53145-2:2000 and DIN 53146:2000.

Contrast Ratio

Contrast ratio values are determined according to ISO 6504/3 at a spreading rate of 7.5 m$^2$/l.

The contrast ratio is calculated as described by the following equation:

$$\text{Contrast ratio } [\%] = \frac{Ry_{(black)}}{Ry_{(white)}} \times 100\%$$

with $Ry_{(black)}$ and $Ry_{(white)}$ being obtained by the measurement of the color values as indicated above.

Gloss Values

The Gloss values are measured at the listed angles according to DIN 67 530 on painted surfaces prepared with a coater gap of 150 µm and 300 µm on contrast cards.

The contrast cards used are Leneta contrast cards, form 3-B-H, size 7⅝×11⅜ (194×289 mm), sold by the company Leneta, and distributed by Novamart, Stafa, Switzerland. The gloss is measured with a gloss measurement device from the company Byk Gardner, Geretsried, Germany. The gloss is obtained by measuring 5 Leneta cards (one measurement each) with the gloss measurement device, and the average value is calculated by the device and can be derived from the display of the device.

Pigment Volume Concentration (PVC, %)

The pigment volume concentration is calculated as described in Section 6.2.3 of the book entitled "Fillers for Paints" by Detlef Gysau (Hannover, Vincentz Network 2017).

$$PVC = \frac{\text{Total sum by volume of all pigments + extenders in paint}}{\text{Total sum by volume of all solid ingredients in paint}} \times 100$$

2. Examples

The following examples are not to be construed to limit the scope of the claims in any manner whatsoever.

Materials

Dispersant

The dispersant is a sodium polyacrylate/sodium phosphate based dispersing agent, which is a blend of partially neutralized sodium polyacrylate (with a molecular weight Mw equal to 12'000 Dalton, measured by GPC) and sodium phosphates, produced by mixing 40% sodium polyacrylate and 85% solid phosphoric acid in a ratio 2:1 based on the dry weight of each additive.

Ground Natural Calcium Carbonate Material 1 (GNCC1)

GNCC1 is a naturally sourced ground calcium carbonate material with a $d_{98}$ (Sedi) of 4 µm, and a $d_{50}$ (Sedi) of 0.9 µm. Furthermore, it has a $d_{98}$ (Mal) of 3.6 µm, and a $d_{50}$ (Mal) of 1.36 µm. The specific surface area (BET) is 6.9 $m^2/g$.

Ground Natural Calcium Carbonate Material 2 (GNCC2)

GNCC2 is a naturally sourced ground calcium carbonate material which is provided as a slurry with 73% solid content and has a $d_{98}$ (Sedi) of 0.9 µm, and a $d_{50}$ (Sedi) of <0.22 µm. Furthermore, it has a $d_{98}$ (Mal) of 1.6 µm, and a $d_{50}$ (Mal) of 0.76 µm. The specific surface area (BET) is 22.9 $m^2/g$.

Ground Natural Calcium Carbonate Material 3 (GNCC3)

GNCC3 is a naturally sourced ground calcium carbonate material which is provided as a powder and has a $d_{98}$ (Sedi) of 10.0 µm, and a $d_{50}$ (Sedi) of 2.51 µm. Furthermore, it has a $d_{98}$ (Mal) of 13.0 µm, and a $d_{50}$ (Mal) of 2.72 µm. The specific surface area (BET) is 3.7 $m^2/g$.

Ground Natural Calcium Carbonate Material 4 (GNCC4)

GNCC4 is a naturally sourced ground calcium carbonate material which is provided as a powder and has a $d_{98}$ (Sedi) of 19.5 µm, and a $d_{50}$ (Sedi) of 4.99 µm.

Furthermore, it has a $d_{98}$ (Mal) of 25.0 µm, and a $d_{50}$ (Mal) of 5.35 µm. The specific surface area (BET) is 2.2 $m^2/g$.

Preparation of Ground Natural Calcium Carbonate Material (Suspension 1 to 4)

Norwegian marble (40-48 µm) was ground at a solid content of 25 wt.-% in a Dynomill Multilab from W. Bachofen AG (total volume of the grinding chamber=600 $cm^3$, mill speed=2 500 rpm, flow=500 $cm^3$ $min^{-1}$, filled with 1070 g of melt fused grinding beads consisting of 68 wt.-% baddeleyit and 32 wt.-% amorphous silica, based on the total weight of grinding beads with a diameter in the range from 1.0 to 1.6 mm) until the $d_{50}$(Sedi) was 6 µm. The suspension was centrifuged to obtain a cake with 75% solid content and a supernatant with 2% solid content. Said cake was diluted with fresh water to the solid content shown in the table, and ground at that solid content in a Dynomill Multilab from W. Bachofen AG (total volume of the grinding chamber=600 $cm^3$, mill speed=2 500 rpm, flow=500 $cm^3$ min–1, filled with 1070 g of melt fused grinding beads consisting of 68 wt.-% baddeleyit and 32 wt.-% amorphous silica, based on the total weight of grinding beads with a diameter in the range from 0.3 to 0.7 mm) until the $d_{98}$(Sedi) was at the desired level (see table).

TABLE 1

| | | Suspensions 1 to 4 | | |
|---|---|---|---|---|
| | CO/IN | Solid content/% | $d_{98}$ (Sedi) | $d_{50}$ (Sedi) |
| Suspension 1 | CO | 20 | 3.0 | 0.80 |
| Suspension 2 | IN | 18 | 1.9 | 0.50 |
| Suspension 3 | IN | 15 | 1.0 | 0.41 |
| Suspension 4 | IN | 13 | 0.8 | 0.34 |

A dispersant was added to the suspensions 1 to 4, and the suspensions were evaporated under vigorous stirring at ambient pressure and with the aid of a heating plate heated to 120° C. to the desired solid content to obtain suspensions 1a to 4c as shown in table 2.

TABLE 2

| | Suspensions 1a to 4c | | | | | | | |
|---|---|---|---|---|---|---|---|---|
| | Suspension 1a | Suspension 2a | Suspension 3a | Suspension 3b | Suspension 3c | Suspension 4a | Suspension 4b | Suspension 4c |
| CO/IN | CO | IN | IN | IN | IN | IN | IN | IN |
| Feed | Suspension 1 | Suspension 2 | Suspension 3 | Suspension 3 | Suspension 3 | Suspension 4 | Suspension 4 | Suspension 4 |
| Dispersant/ppm | 3800 | 5800 | 12000 | 13000 | 14000 | 14000 | 15800 | 17600 |
| Solid content/% | 72 | 72 | 65 | 70 | 72 | 66 | 70 | 72 |
| Brookfield viscosity/mPas | 250 | 250 | 160 | 265 | 365 | 215 | 500 | 945 |
| pH | 10.0 | 10.1 | 11.0 | 10.4 | 10.0 | 10.6 | 10.0 | 10.0 |
| $d_{98}$ (Sedi) | 3.0 | 1.8 | 1.0 | 1.0 | 1.1 | 0.8 | 0.8 | 0.8 |
| $d_{50}$ (Sedi) | 0.86 | 0.58 | 0.34 | 0.32 | 0.32 | 0.26 | 0.25 | 0.24 |
| $d_{98}$ (Mal) | 4.1 | 2.4 | 1.6 | 1.6 | 1.5 | 1.4 | 1.4 | 1.4 |
| $d_{50}$ (Mal) | 1.29 | 0.91 | 0.76 | 0.76 | 0.75 | 0.68 | 0.68 | 0.67 |
| $d_{98}/d_{50}$ (Mal) | 3.2 | 2.6 | 2.1 | 2.1 | 2.1 | 2.0 | 2.0 | 2.0 |
| Spec. surface area/$m^2g^{-1}$ | 7.9 | 10.6 | 16.2 | 16.3 | 16.5 | 19.9 | 19.2 | 19.4 |

3. Application Tests

Emulsion Paint

TABLE 3

Emulsion paints 1 to 10

| | Example | | | | | | | | | |
|---|---|---|---|---|---|---|---|---|---|---|
| | 1 | 2 | 3 | 4 | 5 | 6 | 7 | 8 | 9 | 10 |
| CO/IN | CO | CO | CO | IN | IN | IN | IN | IN | IN | IN |
| Paint composition[1] | | | | | | | | | | |
| Water | 135.3 | 135.3 | 135.3 | 135.3 | 105.8 | 135.3 | 135.3 | 116.6 | 135.3 | 135.3 |
| Bermocoll Prime 3500 | | | | | 4.2 | | | | | |
| Sodium hydroxide 10% | | | | | 2.6 | | | | | |
| ECODIS P 90 | | | | | 1.6 | | | | | |
| Coapur 2025 | | | | | 2.3 | | | | | |
| Calgon N new | | | | | 1.3 | | | | | |
| Byk 038 | | | | | 2.6 | | | | | |
| Byk 349 | | | | | 1.0 | | | | | |
| Texanol | | | | | 2.3 | | | | | |
| Butyl diglycol acetate | | | | | 2.3 | | | | | |
| Dowanol DPnB | | | | | 5.1 | | | | | |
| Mowilith LDM 6119 | | | | | 155.9 | | | | | |
| Coapur 6050 | | | | | 4.5 | | | | | |
| GNCC1 | 460.5 | | | | | | | | | |
| GNCC2 | | 630.8 | | | | | | | | |
| Suspension 1a | | | 639.6 | | | | | | | |
| Suspension 2a | | | | 639.6 | | | | | | |
| Suspension 3a | | | | | 708.5 | | | | | |
| Suspension 3b | | | | | | 657.9 | | | | |
| Suspension 3c | | | | | | | 639.6 | | | |
| Suspension 4a | | | | | | | | 697.7 | | |
| Suspension 4b | | | | | | | | | 657.9 | |
| Suspension 4c | | | | | | | | | | 639.6 |
| water | 218.5 | 48.2 | 39.4 | 39.4 | 0.0 | 21.1 | 39.4 | 0.0 | 21.1 | 39.4 |
| Total | 1000.0 | 1000.0 | 1000.0 | 1000.0 | 1000.0 | 1000.0 | 1000.0 | 1000.0 | 1000.0 | 1000.0 |

[1] All amounts in g

TABLE 4

Product information on products used in emulsion paints 1 to 10

| Product | Manufacturer | Composition | Function |
|---|---|---|---|
| Bermocoll Prime 3500 | AkzoNobel | Celluloseether | Thickener |
| Butyl diglycol acetate | Various | Ester | Coalescing agent |
| Byk 038 | Byk | Mineral oil, contains silicones | Defoamer |
| Byk 349 | Byk | Polyether modified siloxane | Substrate wetting agent |
| Calgon N neu | BK Giulini | Sodium polyphosphate | Dispersing agent |
| Coapur 2025 | Coatex | Polyurethane basis | Rheology modifier |
| Dowanol DPnB | Dow | Dipropylenglycol-n-butylether | Coalescing agent |
| Ecodis P 90 | Coatex | Ammonium salt of polyacrylic acid | Wetting and dispersing agent |
| Mowilith LDM 6119, 50% | Celanese | An aqueous copolymer dispersion based on styrene and an acrylic acid ester | Binder |
| Sodium hydroxide, 10% | Various | Sodium hydroxide solution | pH Regulator |
| Texanol | Eastman | Ester-alcohol | Coalescing agent |

TABLE 5

Emulsion paints 11 to 19

| | Example | | | | | | | | |
|---|---|---|---|---|---|---|---|---|---|
| | 11 | 12 | 13 | 14 | 15 | 16 | 17 | 18 | 19 |
| CO/IN | CO | CO | CO | IN | IN | IN | IN | IN | IN |
| Paint composition[1] | | | | | | | | | |
| Water | | | | | 250.0 | | | | |
| Bermocoll Prime 3500 | | | | | 5.0 | | | | |
| Sodium hydroxide 10% | | | | | 2.0 | | | | |
| ECODIS P 90 | | | | | 3.0 | | | | |
| Calgon N | | | | | 1.0 | | | | |
| Agitan 731 | | | | | 2.0 | | | | |
| Mergal 723 K | | | | | 2.0 | | | | |
| TiONA 595 | 100.0 | 80.0 | 60.0 | 100.0 | 80.0 | 60.0 | 100.0 | 80.0 | 60.0 |
| GNCC3 | | | | | 165.0 | | | | |
| GNCC4 | | | | | 100.0 | | | | |
| GNCC1 | 100.0 | 120.0 | 140.0 | | | | | | |
| Suspension 2a | | | | 138.9 | 166.7 | 194.4 | | | |
| Suspension 3b | | | | | | | 142.9 | 171.4 | 200.0 |
| Mica BM | | | | | 80.0 | | | | |
| Agitan 281 | | | | | 1.0 | | | | |
| Mowilith LDM 1871, 53% | | | | | 120.0 | | | | |
| Water | 69.0 | | | 30.1 | 22.3 | 14.6 | 26.1 | 17.6 | 9.0 |
| Total | 1000.0 | 1000.0 | 1000.0 | 1000.0 | 1000.0 | 1000.0 | 1000.0 | 1000.0 | 1000.0 |

[1]All amounts in g

TABLE 6

Product information on products used in emulsion paints 11 to 19

| Product | Manufacturer | Composition | Function |
|---|---|---|---|
| Bermocoll Prime 3500 | AkzoNobel | Celluloseether | Thickener |
| Sodium hydroxide, 10% | Various | Sodium hydoxide solution | pH Regulator |
| Ecodis P 90 | Coatex | Ammonium salt of polyacrylic acid | Wetting and dispersing agent |
| Calgon N | BK Giulini | Sodium polyphosphate | Dispersing agent |
| Agitan 731 | Münzing | Siloxane | Defoamer |
| Mergal 723 K | Troy | Isothiazolinon (BIT) | Preservative |
| TiONA 595 | Cristal | Titan dioxide | White pigment |
| Mica BM | Aspanger | Glimmer | Filler |
| Agitan 281 | Münzing | Mineral oil | Defoamer |
| Mowilith LDM 1871, 53% | Celanese | Non-plasticized aqueous copolymer dispersion based on ethylene and vinyl acetate | Binder |

TABLE 7

Emulsion paints 20 to 21

| | Example | |
|---|---|---|
| | 20 | 21 |
| | CO/IN | |
| Paint composition[1] | CO | IN |
| Water | 1.0 | |
| Propylene glycol | 1.0 | |
| Tafigel PUR 45 | 0.8 | |
| Tego Foamex 810 | 0.1 | |
| Texanol | 0.7 | |
| Dowanol DPnB | 0.3 | |
| Byk 349 (100%) | 0.2 | |
| Tego Glide 450 (100%) | 0.2 | |
| Methoxybutanol | 1.5 | |
| Mowilith LDM 7717 46% | 56.0 | |
| Byk 381 (52%) | 0.8 | |
| Sudranol 240 | 3.0 | |
| Pigment paste Nr. 82 Tiona 595 (75%)[3] | 27.0 | |
| GNCC2 | | |
| GNCC1 | 3.7 | |
| Suspension 3b | | 5.2 |
| Water | 3.8 | 2.2 |
| Total | 100.0 | 100.0 |

[1]All amounts in g

TABLE 8

Product information on products used in emulsion paints 20 to 21

| Product | Manufacturer | Composition | Function |
| --- | --- | --- | --- |
| Propylene glycol | Diverse | Propylene glycol | Open time |
| Tafigel PUR 45 | Münzing | Urethane basis | Rheology modifier |
| Tego Foamex 810 | Tego | Polyether siloxane copolymer | Defoamer |
| Texanol | Eastman | Ester-alcohol | Coalescing agent |
| TiONA 595 | Cristal | Titan dioxide | White pigment |
| Dowanol DPnB | Dow | Dipropylenglycol-n-butylether | Coalescing agent |
| Byk 349 | Byk | Polyether modified siloxane | Substrate wetting agent |
| Tego Glide 450 | Tego | Polyether siloxane copolymer | Substrate wetting agent |
| Methoxybutanole | Diverse | 3-Methoxy-1-butanole | Solvent |
| Mowilith LDM 7717, 46% | Celanese | Non-plasticized aqueous copolymer dispersion based on acrylic and methacrylic acid esters | Binder |
| Byk 381 | Byk | Polyacrylate | Levelling agent |
| Südranol 240 | SEC | Polyethylene wax dispersion | Blocking- and scratch resistance |

TABLE 9

Composition of Pigmentpaste Nr. 82 Tiona 595 (75%) used in emulsion pastes 20 to 22
Titanium dioxide - Paste (75%) Nr. 82

| | |
| --- | --- |
| Water demin. | 11.0 |
| Tego Dispers 750 W | 6.0 |
| Tafigel PUR 41 | 1.2 |
| Tego Foamex 810 | 1.2 |
| Texanol | 0.7 |
| Dowanol DPnB | 1.2 |
| Titandioxid TiONA 595 | 75.0 |
| Water demin. | 3.7 |
| Total | 100.0 |

All amounts given in table 9 are in g

TABLE 10

Physical data of emulsion paints 1 to 19

| Physical data | Examples 1 to 10 | Examples 11, 14, 17 | Examples 12, 15, 18 | Examples 13, 16, 19 |
| --- | --- | --- | --- | --- |
| PVC | 70.0% | 77.1% | 77.3% | 77.5% |
| Density (solids) | 2.17 gcm$^{-3}$ | 2.44 gcm$^{-3}$ | 2.42 gcm$^{-3}$ | 2.39 gcm$^{-3}$ |
| Density (liquids) | 1.43 gcm$^{-3}$ | 1.58 gcm$^{-3}$ | 1.57 gcm$^{-3}$ | 1.56 gcm$^{-3}$ |
| Volume solids per liter | 343 ml | 383 ml | 386 ml | 388 ml |
| Volume solids per kg | 241 ml | 243 ml | 246 ml | 248 ml |
| Solids content | 54.4% | 61.9% | 61.9% | 61.9% |
| Binder/pigment-ratio | 1:5.84 | 1:8.57 | 1:8.57 | 1:8.57 |

TABLE 11

Physical data of emulsion paints 20 to 21

| Physical data | Example 20, 21 |
| --- | --- |
| PVC | 21.3% |
| Density (liquids) | 1.25 gcm$^{-3}$ |
| Volume solids per liter | 370 ml |
| Volume solids per kg | 295 ml |
| Solids content | 52.4% |
| Binder/pigment-ratio | 0.93:1 |

TABLE 12 measurement data of emulsion paints 1 to 10

|  |  | 1 | 2 | 3 | 4 | 5 | 6 | 7 | 8 | 9 | 10 |
|---|---|---|---|---|---|---|---|---|---|---|---|
|  |  | CO | CO | CO | IN | IN | IN | IN | IN | IN | IN |
| Lightness/Opacity/Sheen Gap = 150 µm |  |  |  |  |  |  |  |  |  |  |  |
| Ry white | % | 87.2 | 87.9 | 90.1 | 90.8 | 92.6 | 92.2 | 91.6 | 92.4 | 92.0 | 91.3 |
| Ry black | % | 79.9 | 77.5 | 82.5 | 86.0 | 89.4 | 88.4 | 86.9 | 89.4 | 88.3 | 86.9 |
| Contrast ratio | % | 91.6 | 88.2 | 91.6 | 94.7 | 95.5 | 95.8 | 94.9 | 96.7 | 96.0 | 95.1 |
| 85° Gloss | % | 42.2 | 70.1 | 42.7 | 58.8 | 71.3 | 69.6 | 64.3 | 74.4 | 71.7 | 68.6 |
| Viscosity ICI (D = 10000 s$^{-1}$) | mPas | 220 | 140 | 120 | 120 | 110 | 220 | 90 | 110 | 220 | 80 |
| Viscosity (Paar Physica MCR 301 PP25, t = 1 min) |  |  |  |  |  |  |  |  |  |  |  |
| D = 1 s$^{-1}$ | mPas | 20683 | 33123 | 13396 | 16376 | 23518 | 25721 | 25050 | 30163 | 29642 | 28386 |
| D = 5 s$^{-1}$ | mPas | 7244 | 9972 | 5345 | 6119 | 8327 | 8797 | 8420 | 10166 | 9594 | 8872 |
| D = 10 s$^{-1}$ | mPas | 4682 | 6566 | 3791 | 4174 | 5472 | 5789 | 5530 | 6572 | 6239 | 5723 |
| D = 40 s$^{-1}$ | mPas | 1946 | 2708 | 1829 | 1881 | 2232 | 2373 | 2282 | 2574 | 2511 | 2311 |

Inventive examples 4 to 10 give higher opacity (contrast ratio) than comparative examples 1 to 3. More precisely, it can be seen that all inventive examples have a contrast ratio of >92.0% in this specific emulsion paint.

Also gloss levels are surprisingly high. In comparison to examples 1 and 3, all inventive examples have a higher gloss. Comparative example 2 shows a comparable or slightly higher gloss than examples 4, 6, 7 and 10 but this higher gloss is compromised by a low opacity. Since it is desired to have both properties on a high level, the inventive examples provide both attributes.

Inventive examples 4 to 10 give higher brightness Ry over black than comparative examples 1 to 3. More precisely, it can be seen that all inventive examples have a brightness Ry over black of >86.0% in this specific emulsion paint.

TABLE 13 measurement data of emulsion paints 11 to 19

|  |  | 11 | 12 | 13 | 14 | 15 | 16 | 17 | 18 | 19 |
|---|---|---|---|---|---|---|---|---|---|---|
|  |  | CO | CO | CO | IN | IN | IN | IN | IN | IN |
| Lightness/Opacity/Sheen Gap = 150 µm |  |  |  |  |  |  |  |  |  |  |
| Ry white | % | 88.9 | 88.4 | 87.9 | 90.4 | 89.6 | 89.3 | 90.1 | 89.9 | 89.6 |
| Ry black | % | 86.5 | 86.1 | 85.0 | 88.7 | 87.2 | 86.6 | 88.1 | 87.6 | 86.9 |
| Contrast ratio | % | 97.3 | 97.3 | 96.7 | 98.1 | 97.3 | 97.0 | 97.8 | 97.4 | 97.1 |
| Viscosity ICI (D = 10000 s$^{-1}$) | mPas | 170 | 180 | 190 | 190 | 200 | 200 | 210 | 200 | 200 |
| Viscosity (Paar Physica MCR 301 PP25, t = 1 min) |  |  |  |  |  |  |  |  |  |  |
| D = 1 s$^{-1}$ | mPas | 59438 | 62514 | 64616 | 68390 | 64361 | 67028 | 69212 | 62057 | 66576 |
| D = 5 s$^{-1}$ | mPas | 16299 | 17006 | 17071 | 19666 | 18559 | 19324 | 19816 | 18652 | 19554 |
| D = 10 s$^{-1}$ | mPas | 9890 | 10306 | 10198 | 11886 | 11241 | 11638 | 11893 | 11315 | 11772 |
| D = 40 s$^{-1}$ | mPas | 3874 | 4090 | 3941 | 4478 | 4309 | 4397 | 4426 | 4287 | 4386 |

Examples to compare are always 11, 14 and 17, as well as examples 12, 15 and 18, and examples 13, 16 and 19. Examples 11, 14 and 17 work with 10% $TiO_2$, examples 12, 15 and 18 with 8% $TiO_2$, and examples 13, 16 and 19 with 6% $TiO_2$ in the coating formulation. The missing part of $TiO_2$ is replaced with the ground natural calcium carbonate according to the present invention.

Inventive examples 14 and 17 as well as 15 and 18 as well as 16 and 19 give higher opacity (contrast ratio) than comparative examples 11, 12 and 13.

Inventive examples 14 and 17 as well as 15 and 18 as well as 16 and 19 give higher brightness Ry over black than comparative examples 11, 12 and 13. More precisely, it can be seen that all the inventive examples have a brightness Ry over black of at least 86.6% in these specific emulsion paints.

TABLE 14 measurement data of emulsion paints 20 to 21

| Lightness/Opacity/Sheen | | Example 20 CO | 21 IN |
|---|---|---|---|
| Gap = 150 μm | | CO | IN |
| Ry white | % | 91.1 | 91.5 |
| Ry black | % | 86.0 | 86.7 |
| Contrast ratio | % | 94.4 | 94.8 |
| 85° Gloss | % | 95 | 96 |
| Viscosity ICI (D = 10000 $s^{-1}$) | mPas | 220 | 210 |

Inventive example 21 gives higher opacity (contrast ratio) than comparative example 20.

Also the gloss level is surprisingly high. More precisely, inventive example 21 gives higher gloss than comparative example 20.

Inventive example 21 gives higher brightness Ry over black than comparative example 20.

The invention claimed is:

1. A coating composition comprising at least one binder and at least one ground natural calcium carbonate material, wherein the at least one ground natural calcium carbonate material has
   i) a volume median particle size $d_{50}$ value ($d_{50}$(Mal)) in the range from >0.4 μm and <0.9 μm,
   ii) a top cut ($d_{98}$(Mal)) in the range from >1.0 μm and <2.5 μm,
   iii) a $d_{98}/d_{50}$ (Mal) ratio of <3, and
   iv) a specific surface area (BET) of <20 $m^2$/g as measured using nitrogen and the BET method according to ISO 9277:2010.

2. The coating composition according to claim 1, wherein the at least one ground natural calcium carbonate material has a top cut ($d_{98}$(Mal)) in the range from >1.1 μm and <2.2 μm.

3. The coating composition according to claim 1, wherein the at least one ground natural calcium carbonate material has a $d_{98}/d_{50}$ (Mal) ratio in the range from >0.5 and <2.9.

4. The coating composition according to claim 1, wherein the at least one ground natural calcium carbonate material has a specific surface area (BET) in the range from >5 $m^2$/g and <20 $m^2$/g as measured using nitrogen and the BET method according to ISO 9277:2010.

5. The coating composition according to claim 1, wherein the at least one ground natural calcium carbonate material is selected from the group consisting of marble, limestone, dolomite and/or chalk.

6. The coating composition according to claim 1, wherein the coating composition has a pigment volume concentration (PVC) of from 5 vol.-% to 98 vol.

7. The coating composition according to claim 1, wherein the at least one binder is selected from the group consisting of alkyd resin, epoxy resin, epoxy ester resin, poly(vinyl alcohol), poly(vinyl pyrrolidone), poly(vinyl acetate), poly (oxazolines), poly(vinylacetamides), partially hydrolyzed poly(vinyl acetate/vinyl alcohol), poly((meth)acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl(meth) acrylate), poly(2-ethylhexyl (meth)acrylate), copolymers of (meth)acrylates, copolymers of vinylacetate and n-butyl (meth)acrylate casein, copolymers of polyvinylchloride, cellulose ethers, xanthan, vinyl esters of versatic acid a vinyl acetate and ethylene copolymer, a styrene and acrylic ester copolymer and mixtures thereof.

8. The coating composition according to claim 1, wherein the at least one binder is selected from the group consisting of copolymers of (meth)acrylates, poly(styrene-co-(meth) acrylate), a vinyl acetate and ethylene copolymer, a styrene and acrylic ester copolymer, an acrylic and methacrylic acid ester copolymer, poly(vinyl acetate) and mixtures thereof.

9. The coating composition according to claim 1, wherein the coating composition further comprises titanium dioxide.

10. The coating composition according to claim 9, wherein the titanium dioxide:ground natural calcium carbonate material dry weight ratio is of 90:10 to 20:80.

11. The coating composition according to claim 1, wherein the gloss and/or opacity and/or brightness Ry over black of the coating composition applied to a substrate is increased by at least 1% relative to the gloss and/or opacity and/or brightness Ry over black of an identical coating composition that has been treated the same way wherein the ground natural calcium carbonate material is fully replaced by a ground natural calcium carbonate material with at least one of the parameters i) to iv) outside the ranges.

12. The coating composition according to claim 1, wherein the coating composition further comprises a dispersant.

13. A method of coating an article comprising providing a coating composition including at least one binder and at least one ground natural calcium carbonate material having
   i) a volume median particle size $d_{50}$ value ($d_{50}$(Mal)) in the range from >0.4 and <0.9 μm,
   ii) a top cut ($d_{98}$(Mal)) in the range from >1.0 μm and <2.5 μm,
   iii) a $d_{98}/d_{50}$ (Mal) ratio of <3, and
   iv) a specific surface area (BET) of <20 $m^2$/g as measured using nitrogen and the BET method according to ISO 9277:2010,
   and applying the coating composition to the article.

14. An article that is coated with the coating composition according to claim 1, wherein the article is made of concrete, wood, paper, metal or board.

15. Paint comprising the coating composition of claim 1.

16. The coating composition according to claim 1, wherein the at least one ground natural calcium carbonate material is marble.

17. The coating composition according to claim 1, wherein the coating composition has a pigment volume concentration (PVC) of from 60 vol.-% to 85 vol.-%.

18. The coating composition according to claim 9, wherein the at least one binder is selected from the group consisting of a vinyl acetate and ethylene copolymer, a styrene and acrylic ester copolymer, an acrylic and methacrylic acid ester copolymer and mixtures thereof; wherein the titanium dioxide:ground natural calcium carbonate material dry weight ratio is of 80:20 to 40:60; wherein the gloss and/or opacity and/or brightness Ry over black of the coating composition applied to a substrate is increased by at least 5% relative to the gloss and/or opacity and/or brightness Ry over black of an identical coating composition that has been treated the same way wherein the ground natural calcium carbonate material is fully replaced by a ground natural calcium carbonate material with at least one of the parameters i) to iv) outside the ranges; and wherein the coating composition further includes a dispersant comprised of a polyacrylate neutralized with sodium, ammonium and/or potassium and/or hydrophobically modified polyacrylate.

19. A coating composition comprising at least one binder and at least one ground natural calcium carbonate material, wherein the at least one ground natural calcium carbonate material has
   i) a volume median particle size $d_{50}$ value ($d_{50}$(Mal)) in the range from >0.6 μm and <0.8 μm,
   ii) a top cut ($d_{98}$(Mal)) in the range from >1.3 μm and <1.8 μm,
   iii) a $d_{98}/d_{50}$ (Mal) ratio in the range from >1.5 and <2.5, and
   iv) a specific surface area (BET) in the range from 15 $m^2/g$ and 20 $m^2/g$ as measured using nitrogen and the BET method according to ISO 9277:2010.

* * * * *